April 18, 1933.   J. A. JANSON   1,903,910
WASTE ELIMINATOR FOR ICE CREAM CABINETS
Filed Jan. 14, 1932
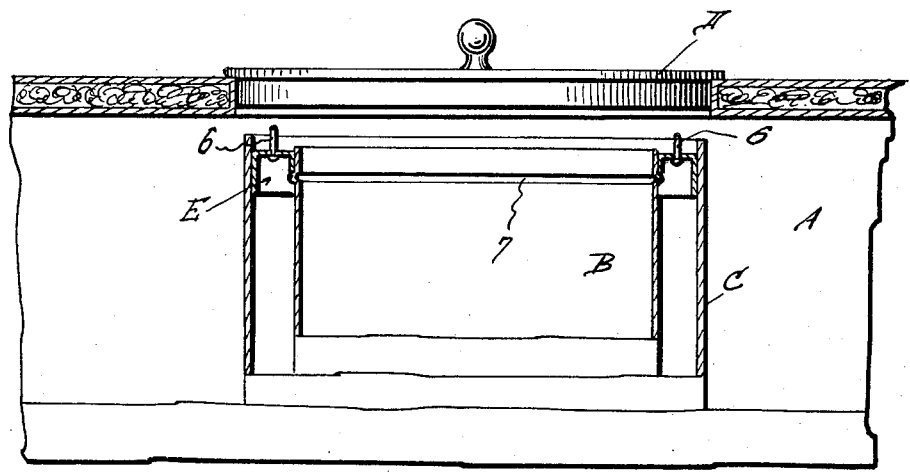
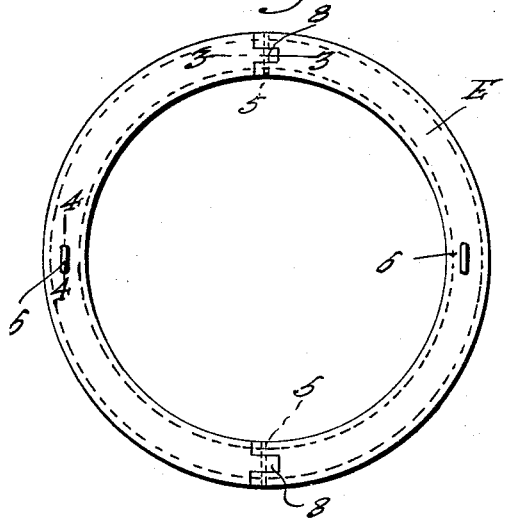
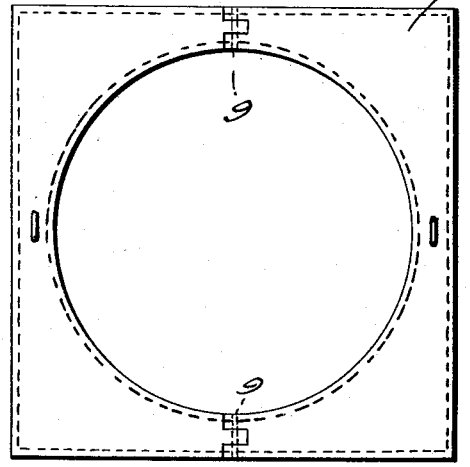
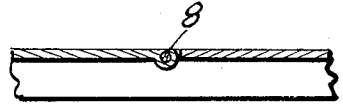
Inventor
Joseph A. Janson
By Clarence A. O'Brien
Attorney Patented Apr. 18, 1933

1,903,910

UNITED STATES PATENT OFFICE

JOSEPH A. JANSON, OF PROVIDENCE, RHODE ISLAND

WASTE ELIMINATOR FOR ICE CREAM CABINETS

Application filed January 14, 1932. Serial No. 586,631.

This invention relates to a waste eliminator for ice cream cabinets, the general object of the invention being to provide a closure member for the space between each ice cream container and the member which surrounds said container in an ice cream cabinet, the closure member acting to keep the container in a firm position while its contents is being scooped therefrom and the device also acts to prevent ice cream from dropping between the container and the surrounding member as well as to prevent other materials from dropping into the space between the two members. The device also acts to prevent air from entering the space between the members when the lid of the cabinet is removed so that a small amount of electricity is used to maintain the proper temperature. The device also improves the appearance of the cabinet as it prevents one from looking into the space between the ice cream container and the surrounding member.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is a fragmentary sectional view of an ice cream cabinet showing the invention in use.

Figure 2 is a top plan view of the invention.

Figure 3 is a section on line 3—3 of Figure 2.

Figure 4 is a section on line 4—4 of Figure 2.

Figure 5 is a modification of the device showing the invention in use with a surrounding member of rectangular shape.

Referring to Figure 1, the letter A indicates the usual ice cream cabinet which contains a plurality of containers B each of which has a member C surrounding the same and spaced therefrom. The lid for gaining access to the container is shown at D.

It is the object of my invention to provide means for closing the space between each container B and a surrounding member C and in carrying out my invention I provide a closure member E which is of annular shape when the surrounding member C is of cylindrical form as shown in Figures 1 and 2, but which is of exterior rectangular shape as shown in the drawing in Figure 5 when the member C is of rectangular shape. This closure member is formed of two sections which are hingedly connected together as shown at 5 and each section is provided with an eye member 6 which is placed at the center of the section. The closure member is of channel shape in cross section with its outer flange of greater length than its inner flange as shown in Figure 1 with the inner flange resting adjacent the bead 7 of the top of the container B.

I prefer the form hereby providing a tongue 8 on one section fitting in a recess in the other section and passing a pin through the parts as shown at 9 in Figure 3.

Thus I provide a simple means for closing the space between the ice cream container and the surrounding member of an ice cream cabinet, this closure being formed in sections hingedly connected together to facilitate the placing of the member in position and its removal from the device when desired, the eye member 6 facilitating the handling of the device. As before state this device will prevent warm air from entering the space between the container and its surrounding member when the lid D is removed, thereby reducing the amount of current used to keep the cabinet at the desired temperature. Also to prevent ice cream and other materials from dropping into the space and adds to the attractiveness of the device as it prevents a customer from seeing the unsightly interior of the surrounding member C.

It is thought from the foregoing description that the advantages and novel features of the invention will be readily apparent.

It is to be understood that changes may be made in the construction and in the combination and arrangement of the several parts, provided that such changes fall within the scope of the appended claim.

What is claimed is:—

In an ice cream cabinet and in combination with an ice cream container and its surrounding member, a closure member for closing the upper part of the space between the container and said member, said closure member being formed of sections hingedly connected together and handle parts on the closure member, said closure member being of channel-shape in cross section with its flanges depending downwardly with the inner flange resting against a bead of the ice cream container.

In testimony whereof I affix my signature.

JOSEPH A. JANSON.